United States Patent
Ewe et al.

(10) Patent No.: US 9,788,172 B1
(45) Date of Patent: Oct. 10, 2017

(54) CALL HANG TIME INDICATOR FOR AN ELECTRONIC COMMUNICATIONS DEVICE

(71) Applicant: MOTOROLA SOLUTIONS, INC., Chicago, IL (US)

(72) Inventors: Soo Chait Ewe, Penang (MY); Margaret Lee Hing Choo, Penang (MY); Dennis Lim, Penang (MY); Seng Guan Ch'Ng, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/447,026

(22) Filed: Mar. 1, 2017

(51) Int. Cl.
  *H04B 7/00* (2006.01)
  *H04W 4/10* (2009.01)
  *H04L 29/06* (2006.01)
  *H04L 12/24* (2006.01)

(52) U.S. Cl.
  CPC .............. *H04W 4/10* (2013.01); *H04L 41/22* (2013.01); *H04L 69/28* (2013.01); *H04M 2250/22* (2013.01)

(58) Field of Classification Search
  CPC ....... H04W 4/10; H04W 4/08; H04W 76/005; H04W 76/048; H04W 76/028; H04W 76/06; H04W 84/08; H04L 65/4061; H04L 29/06442
  USPC .................................................. 455/518, 519
  See application file for complete search history.

(56) References Cited

U.S. PATENT DOCUMENTS

| 8,103,298 | B2 | 1/2012 | Ong et al. | |
|---|---|---|---|---|
| 9,288,639 | B2 | 3/2016 | Kerger et al. | |
| 2009/0042556 | A1* | 2/2009 | Saito | H04M 3/56 455/422.1 |
| 2015/0341759 | A1* | 11/2015 | Kerger | H04L 65/4061 455/26.1 |
| 2016/0309413 | A1* | 10/2016 | De Sabatino | H04W 52/0229 |

OTHER PUBLICATIONS

Makayama, "PhotoDial for iPhone—tap a picture to dial a contact,"website article (2008) 2 pages, http://www.makayama.com/photodial.html.

* cited by examiner

*Primary Examiner* — Tu X Nguyen
(74) *Attorney, Agent, or Firm* — Michael Best & Friedrich LLP (57) ABSTRACT

An electronic communications device including a transceiver, a touch screen display, and an electronic processor and a method for controlling same. The method includes generating, with the electronic processor, a graphical user interface including a soft push-to-talk button and a call hang time indicator, indicating visually a call hang time, in proximity to the soft push-to-talk button. The method also includes displaying the graphical user interface on the touch screen display, receiving, from the touch screen display, a first input selecting the soft push-to-talk button, and, in response to receiving the first input, establishing a push-to-talk channel via the transceiver.

18 Claims, 8 Drawing Sheets

CALL HANG TIME INDICATOR FOR AN ELECTRONIC COMMUNICATIONS DEVICE

BACKGROUND OF THE INVENTION

Some electronic communications devices, such as mobile telephones and two-way radios, provide push-to-talk functionality. Push-to-talk is a method of transmitting audio communications over a half-duplex communication channel. Some electronic communications devices include a mechanical input mechanism to place the communication device into the transmit mode and the reception mode. Some networks that allow push-to-talk communication implement a call hang time (that is, the time period after a push-to-talk transmission has ended, during which the push-to-talk channel is reserved for further transmission of audio communications). In such networks, the expiration of the call hang time may be indicated by an audio cue, such as a beep. As an alternative to or in addition to the mechanical input mechanisms, an electronic communications device may generate and display a graphical user interface that includes "soft" push-to-talk buttons on a touch screen. The graphical user interface may eliminate the need for mechanical input mechanisms and their respective call hang time indicators.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

. Embodiments presented herein provide, among other things, a call hang time indicator for a graphical user interface of an electronic communications device.

One example embodiment provides an electronic communications device. The device includes a transceiver, a touch screen display, and an electronic processor electrically coupled to the transceiver and the touch screen display. The electronic processor is configured to generate a graphical user interface including a soft push-to-talk button and a call hang time indicator. In one example, the call hang time indicator visually indicates or presents a call hang time in proximity to the soft push-to-talk button. The electronic processor is also configured to display the graphical user interface on the touch screen display. The electronic processor is configured to receive, from the touch screen display, a first input selecting the soft push-to-talk button. The electronic processor is also configured to in response to receiving the first input, establish a push-to-talk channel via the transceiver.

Another example embodiment provides a method for controlling an electronic communications device including a transceiver, a touch screen display, and an electronic processor. The method includes generating, with the electronic processor, a graphical user interface including a soft push-to-talk button and a call hang time indicator, indicating visually a call hang time, in proximity to the soft push-to-talk button. The method includes displaying the graphical user interface on the touch screen display. The method includes receiving, from the touch screen display, a first input selecting the soft push-to-talk button. The method includes in response to receiving the first input, establishing a push-to-talk channel via the transceiver.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
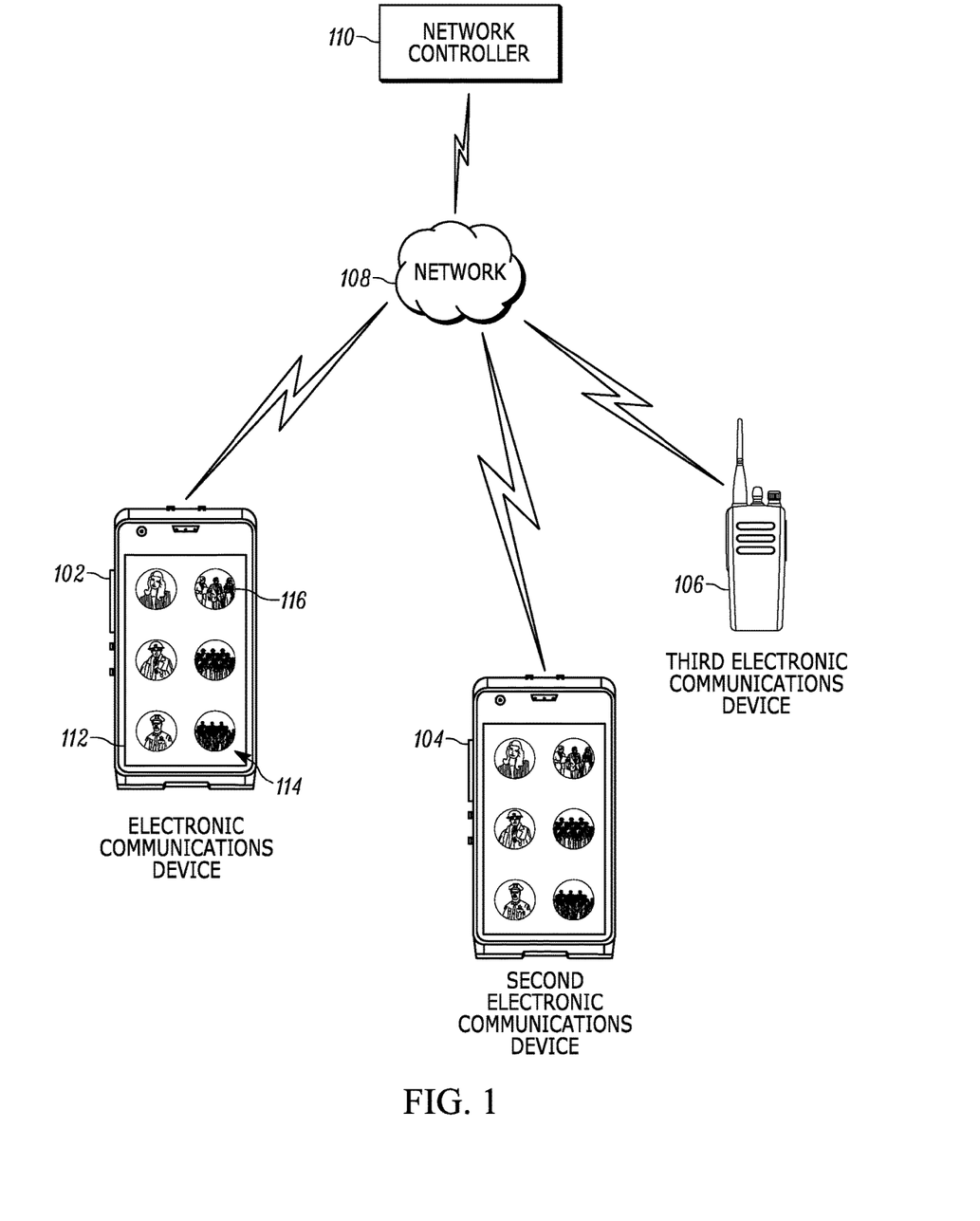
FIG. 1 is a diagram of a communications system including an electronic communications device in accordance with some embodiments.

FIG. 1 is a diagram of a communications system 100. In the example illustrated, the communications system 100 includes an electronic communications device 102, a second electronic communications device 104, a third electronic communications device 106, a network 108, and a network controller 110. The electronic communications device 102, the second electronic communications device 104, and the third electronic communications device 106 are communicatively coupled via the network 108. The network 108 is a communications network including wireless and wired connections. The network 108 may be implemented using a land mobile radio (LMR) network, a cellular network (for example, a Long Term Evolution (LTE) network), or a combination of both. However, the concepts and techniques embodied and described herein may be used with networks using other protocols, for example, Global System for Mobile Communications (or Groupe Spécial Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. As described in detail below, the electronic communications device 102, the second electronic communications device 104, and the third electronic communications device 106 transmit and receive voice and other communications types via the network 108. In some embodiments, communications with other external devices (not shown) occur over the network 108.

The electronic communications device 102, the second electronic communications device 104, and the third electronic communications device 106 communicate with each other using, among other modes, push-to-talk half-duplex voice communications.

Figure 2:
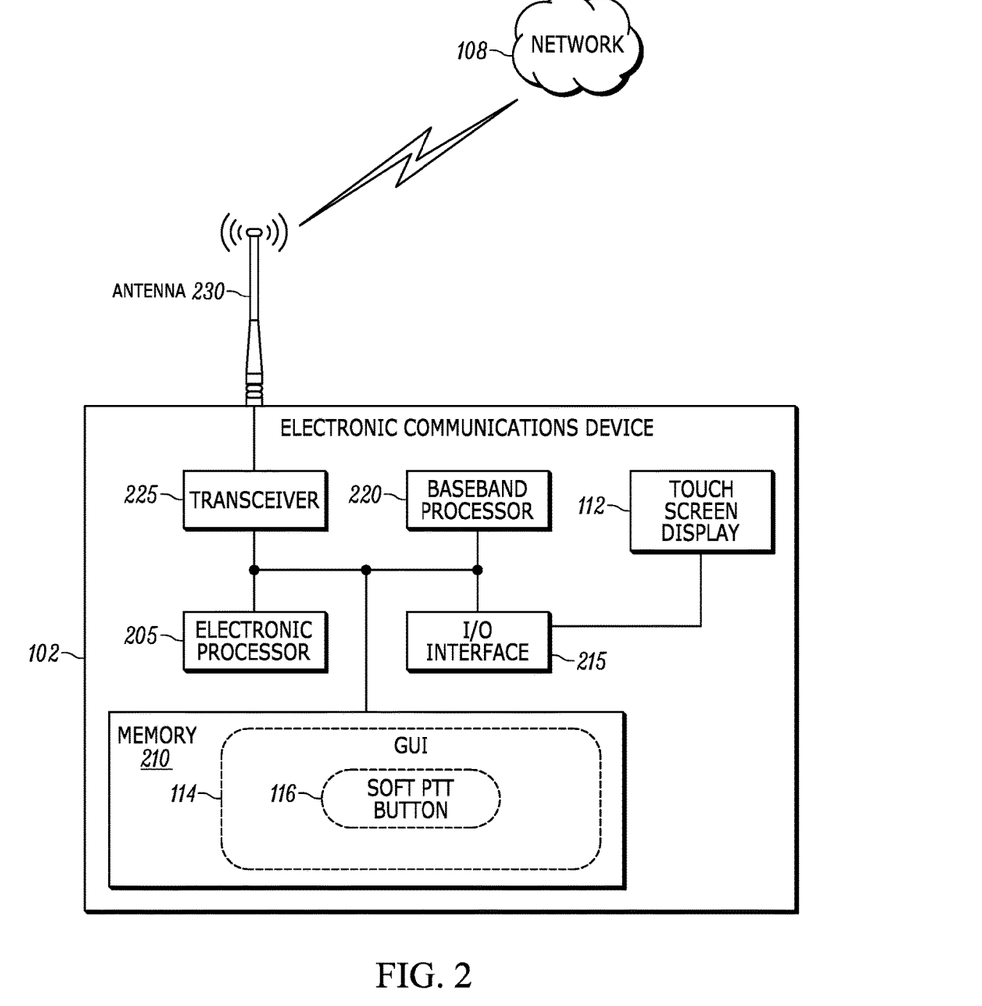
FIG. 2 is a diagram of the electronic communications device from the system of FIG. 1 in accordance with some embodiments.

The electronic communications device 102, described more particularly below with respect to FIG. 2, is a wireless communication device that includes hardware and software that enable it to communicate via the network 108. As described in detail below, the electronic communications device 102 includes a touch screen display, which displays a graphical user interface 114, including a soft push-to-talk button 116.

The second electronic communications device 104 and the third electronic communications device 106 are configured and operate similarly to the electronic communications device 102 and include, or are capable of being coupled to, a network modem or components to enable wireless network communications (such as an amplifier, antenna, and the like), including push-to-talk communications, via the network 108.

The network controller 110 includes one or more computer systems suitable for controlling the operation of the network 108. In some embodiments, the network controller is capable of assigning the electronic communications device 102, the second electronic communications device 104, and the third electronic communications device 106, or combinations thereof to one or more talk groups and facilitating communications therebetween. For example, the network controller 110 may, upon receiving a request from one of the communications devices, establish push-to-talk channels between two or more communications devices based on talk group identifiers, device identifiers, or both. In some embodiments, push-to-talk communications occurs between the communications devices without the involvement of the network controller 110.

FIG. 2 is a diagram of an example of the electronic communications device 102. In the embodiment illustrated, the electronic communications device 102 includes an electronic processor 205, a memory 210, an input/output interface 215, a baseband processor 220, a transceiver 225, an antenna 230, and the touch screen display 112. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, data and instructions for generating the graphical user interface (GUI) 114 and the soft push-to-talk (PTT) button 116 (described in detail below).

The input/output interface 215 is configured to receive input and to provide output to peripherals. The input/output interface 215 obtains information and signals from, and provides information and signals to, (for example, over one or more wired and/or wireless connections) devices both internal and external to the electronic communications device 102.

The electronic processor 205 is configured to control the baseband processor 220 and the transceiver 225 to transmit and receive voice and other data to and from the electronic communications device 102. The baseband processor 220 encodes and decodes digital data sent and received by the transceiver 225, including push-to-talk audio communications. The transceiver 225 transmits and receives radio signals to and from various wireless communications networks (for example, the network 108) using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

The electronic communications device 102 implements the graphical user interface 114, generated by the electronic processor 205, from instructions and data stored in the memory 210, and presented on the touch screen display 112. The touch screen display 112 is a suitable touch-sensitive interface display such as, for example, a liquid crystal display (LCD) touch screen, or an organic light-emitting diode (OLED) touch screen. The touch screen display 112 displays output and receives user input using detected physical contact (for example, via detected capacitance or resistance). The graphical user interface 114 is described in detail below with respect to FIGS. 3 through 13.

In some embodiments, the electronic communications device 102 is a smart telephone. In other embodiments, the electronic communications device 102 may be a tablet computer, a smart watch, a portable radio, a combination of the foregoing, or another portable or mobile electronic device containing software and hardware enabling it to operate as described herein.

As noted above, in some embodiments, the second electronic communications device 104 and the third electronic communications device 106 are configured and operate similarly to the electronic communications device 102 and may include similar components as described above with respect to FIG. 2.

Figure 3:
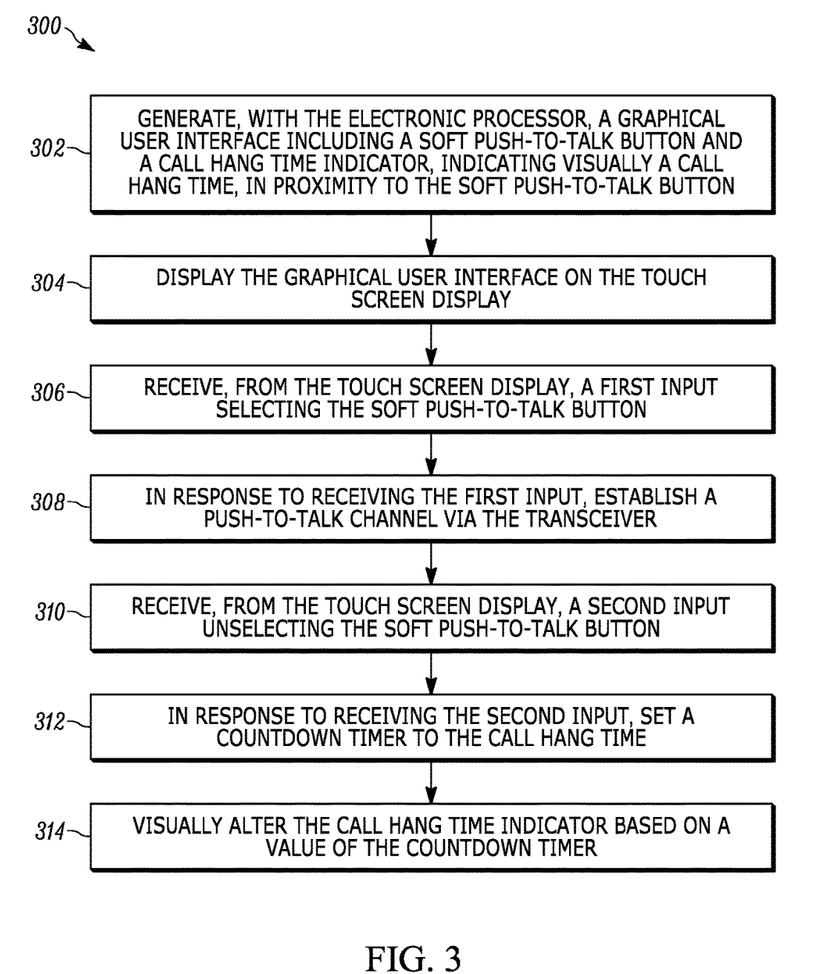
FIG. 3 is a flowchart of a method for controlling an electronic communications device in accordance with some embodiments.

FIG. 3 illustrates an example method 300 for controlling the electronic communications device 102. The method 300 is described with respect to FIGS. 4 through 13, which illustrate embodiments of the graphical user interface 114 and the soft push-to-talk button 116 displayed on the touch screen display 112 of the electronic communications device 102. The method 300 is described as being performed by the electronic communications device 102 and, in particular, the electronic processor 205. The method 300 is described in terms of a single soft push-to-talk button 116. However, the methods described herein are applicable to one or more soft push-to-talk buttons in a single graphical user interface and may be implemented on or with multiple electronic processors.

Figure 4:
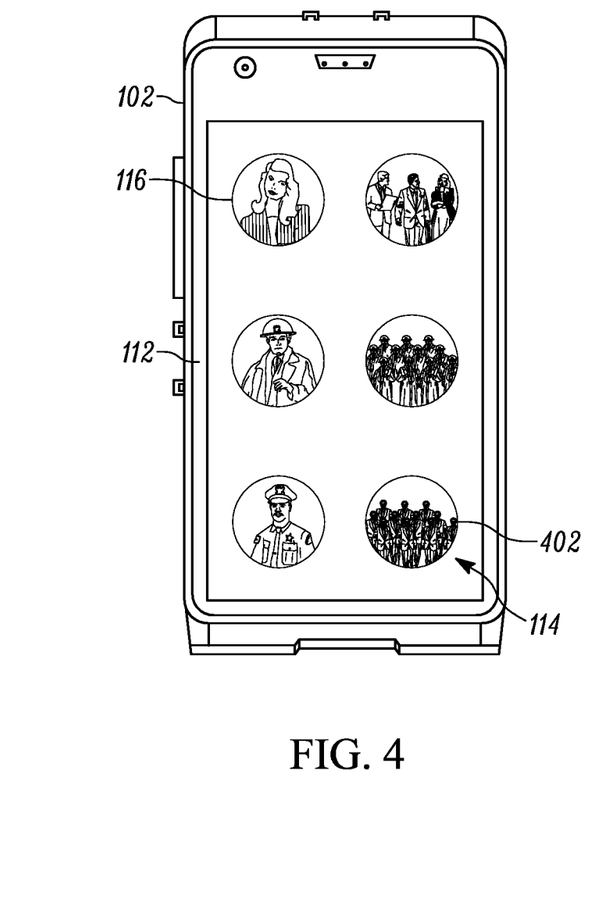
FIG. 4 is a graphical user interface for the portable electronic device of FIG. 2 in accordance with some embodiments.

At block 302, the electronic processor 205 generates the graphical user interface 114, which enables a user to interact with the electronic communications device 102 via the touch screen display 112. In some embodiments, the electronic processor 205 may retrieve and execute instructions from the memory 210 to generate and display the graphical user interface 114 on the touch screen display 112 (block 304). As illustrated in FIG. 4, the graphical user interface 114 includes the soft push-to-talk button 116. The soft push-to-talk button 116 may be used by a user of the electronic communications device 102 to control push-to-talk communications. Push-to-talk communication may be between one individual and another individual or between one individual and a group of individuals (for example, via a talk group).

The soft push-to-talk button 116, when selected (for example, by a user touching or pressing the soft push-to-talk button 116 on the touch screen display 112) causes the electronic processor 205 to establish a push-to-talk communications channel via the transceiver 225. Selection of the soft push-to-talk button 116 also causes transmission of an audio communication from the electronic communications device 102 to one or more other devices (for example, the second electronic communications device 104 and the third electronic communications device 106). When the soft push-to-talk button 116 is unselected (for example, by a user removing the touch or press from the soft push-to-talk button 116, or performing some other gesture on the touch screen display 112), the transceiver 225 is placed into a reception mode to receive a response to the audio communication. In some embodiments, as illustrated in FIG. 4, soft push-to-talk buttons may visually indicate the target of the push-to-talk channel activated when the buttons are selected. For example, the soft push-to-talk button 116 depicts a single user. Selecting the soft push-to-talk button 116 establishes a push-to-talk channel with a device of that user. In another example, the soft push-to-talk button 402 depicts a group of users. Selecting the soft push-to-talk button 402 establishes a push-to-talk channel with the devices of those users (for example, with a talk group including the user of the electronic communications device 102 and the users depicted on the soft push-to-talk button 402).

Figure 5:
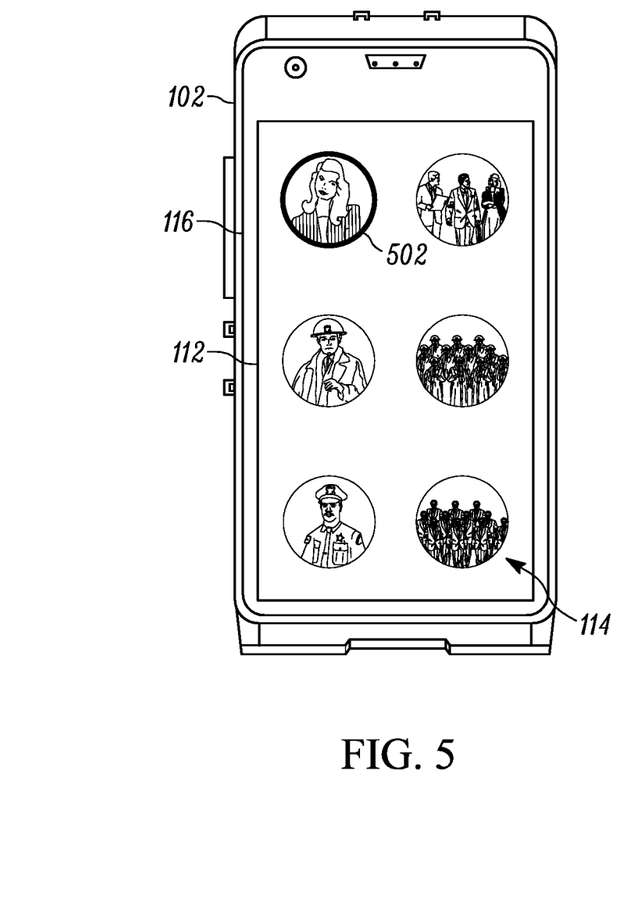
FIGS. 5, 6, and 7 illustrate a call hang time indicator for the graphical user interface of FIG. 4 in accordance with some embodiments.

As illustrated in FIG. 5, the graphical user interface 114 also includes a call hang time indicator 502 in proximity to the soft push-to-talk button 116. As noted above, in some embodiments, push-to-talk communications may be coordinated by the network controller 110. For example, the network controller 110, upon receiving a request from the electronic communications device 102, may establish a push-to-talk communications channel for use by the transceiver 225. A call hang time is a time period (after a push-to-talk transmission has ended), during which the push-to-talk channel remains available to the transceiver 225 for transmission of audio communications. For example, when a push-to-talk channel is setup for communications between members of a talk group, the call hang time reserves the channel for members of the talk group for a time after each transmission. This prevents non-talk group users from interrupting the talk group users and produces smoother conversation.

The call hang time indicator 502 visually indicates the call hang time. In some embodiments, the call hang time indicator 502 is generated by the electronic processor 205, but not displayed until a push-to-talk transmission has ended and a subsequent call hang time period has begun. In other embodiments, the call hang time indicator 502 is displayed continuously, and changes form to show that a call hang time is active. For example, as illustrated in FIG. 5, the call hang time indicator 502 may be an outline or a ring around the soft push-to-talk button 116. In some embodiments, the outline may not appear until a push-to-talk transmission has ended. In other embodiments, the outline may appear in one color or pattern to indicate that a call hang time is possible for push-to-talk transmissions, and in another color or pattern to indicate that a call hang time period is active.

Figure 6:
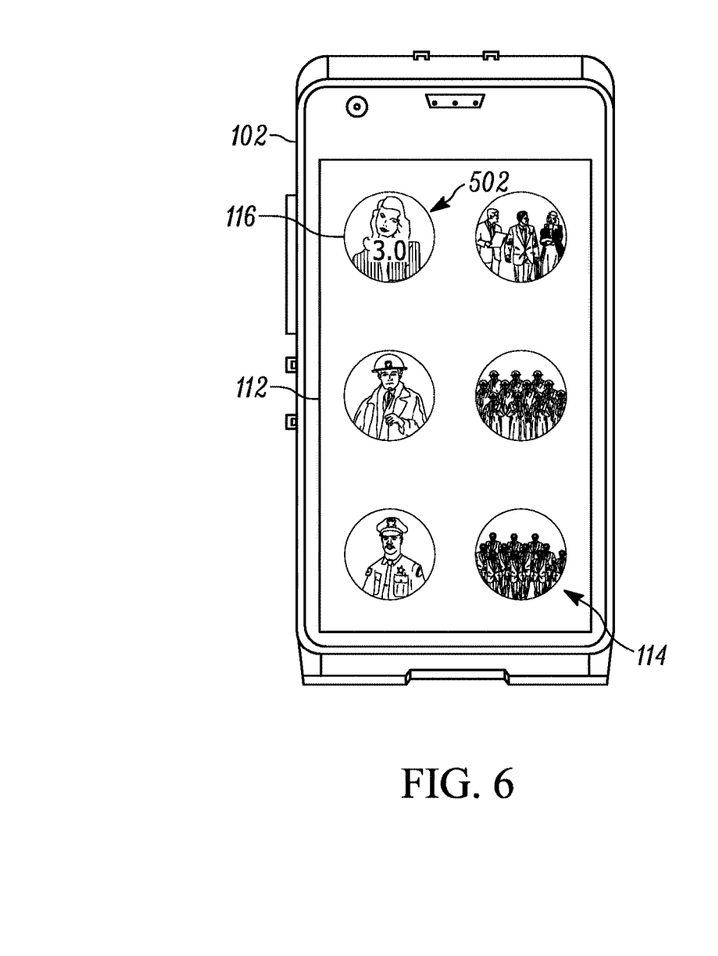

In another embodiment, illustrated in FIG. 6, the call hang time indicator includes a numeric representation of the call hang time (for example, at least one digit superimposed on the soft push-to-talk button 116), indicating the duration of the call hang time period. In some embodiments, the at least one digit may be proximate to the soft push-to-talk button 116 (for example, positioned near the top, bottom, or sides of the button), rather than superimposed on it.

Figure 7:
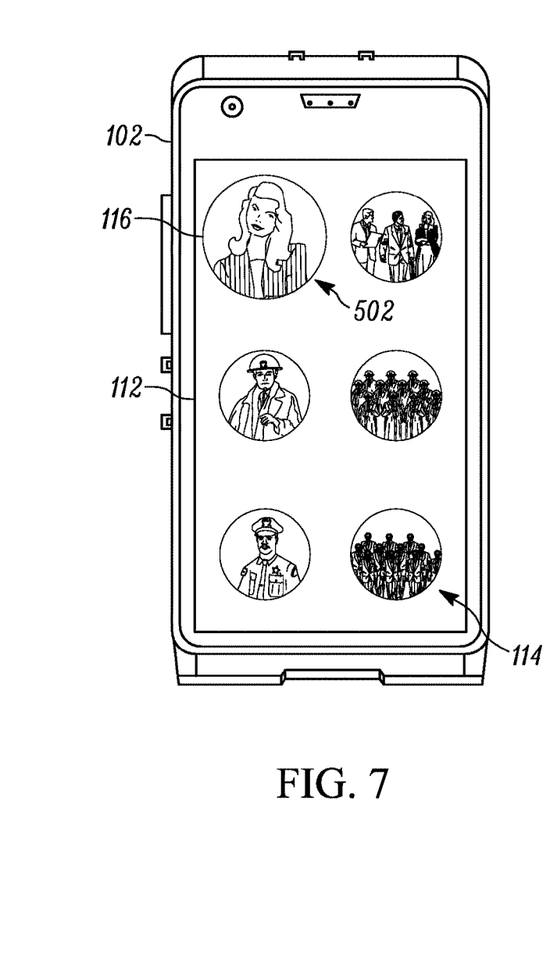

In some embodiments, the call hang time indicator 502 may be a characteristic of the soft push-to-talk button 116 itself. For example, as illustrated in FIG. 7, the size of the soft push-to-talk button 116 may be used to indicate the call hang time. For example, the soft push-to-talk button 116 may be larger than other soft push-to-talk buttons in the graphical user interface 114. In another embodiment, the colors of the soft push-to-talk button 116 may be altered to indicate a call hang time. For example, the button may be displayed in photonegative, or a color (for example, in the form of a glow, a shade, or a hue) may be applied to the button.

Figure 8:
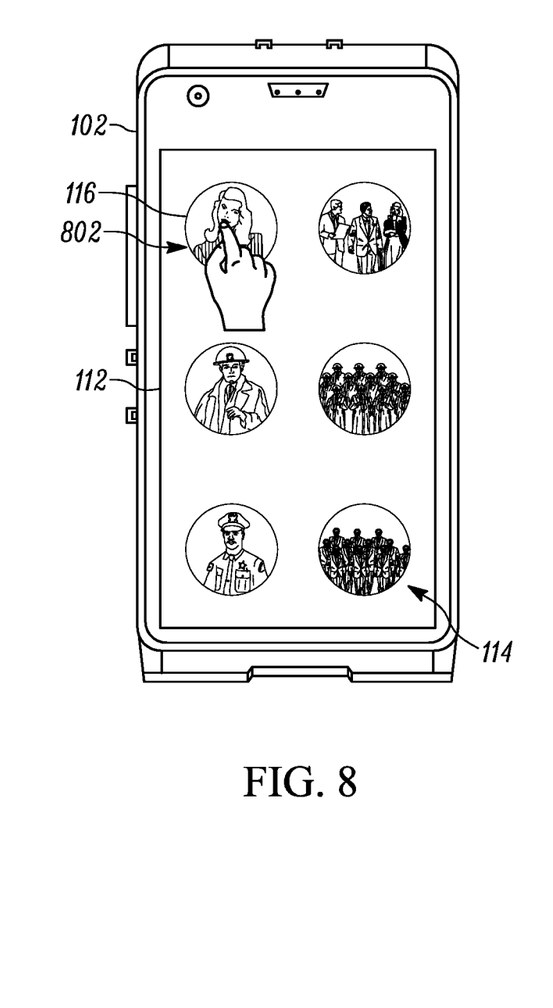
FIG. 8 is a graphical user interface for the portable electronic device of FIG. 2 in accordance with some embodiments.

Returning to FIG. 3, at block 306, the electronic processor 205 receives, from the touch screen display 112, a first input 802 selecting the soft push-to-talk button 116 (See FIG. 8). As illustrated, the first input 802 is a single-finger touch (or tap) input. In other embodiments, the first input 802 (and other inputs described herein) may be a single-finger long touch input, a single-finger press input, a double-finger tap input, a double-finger press input, or another suitable gesture-based input.

At block 308, in response to receiving the first input 802, the electronic processor 205 establishes a push-to-talk channel via the transceiver 225. As noted above, in some embodiments, the electronic processor 205 establishes the push-to-talk channel through the network controller 110. While the soft push-to-talk button is selected, audio communications from the electronic communications device 102 are transmitted by the transceiver 225 over the push-to-talk channel to one or more devices using the push-to-talk channel (for example, the second electronic communications device 104 and the third electronic communications device 106).

At block 310, the electronic processor 205 receives, from the touch screen display 112, a second input unselecting the soft push-to-talk button 116. In some embodiments, the second input may be the end of the first input 802 (for example, a single-finger long touch ends when the user desires to stop transmitting audio communications). In other embodiments, the second input may be another gesture (for example, a second touch or press detected on the soft push-to-talk button 116, or elsewhere on the touch screen display 112). Regardless of the type of input, the electronic processor 205 is configured to interpret the second input as a request to cease push-to-talk transmission on the push-to-talk channel established by selection of the soft push-to-talk button 116.

At block 312, the electronic processor 205, in response to receiving the second input, sets a countdown timer to the call hang time. The call hang time is predetermined and may be different for each push-to-talk channel. The call hang time(s) may be stored in the memory 210, received from the network controller 110, or both. The electronic processor 205 utilizes the countdown timer to track the call hang time remaining before the push-to-talk channel is no longer available to the transceiver 225. When the call hang time is expired (the countdown timer reaches zero), the electronic processor 205 must re-establish the push-to-talk channel prior to transmitting audio communications.

Figure 9:
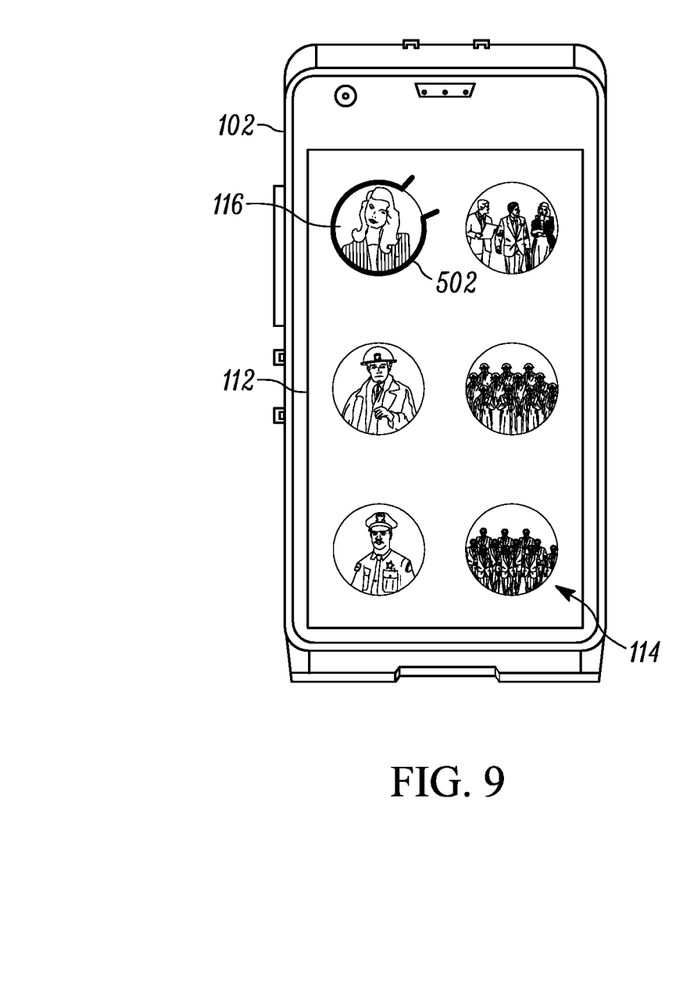
FIGS. 9 and 10 illustrate call hang time indicators for the graphical user interface of FIG. 4 in accordance with some embodiments.

At block 314, the electronic processor 205 visually alters the call hang time indicator 502 based on a value of the countdown timer. Visually altering the call hang time indicator 502 indicates to a user of the electronic communications device 102 the remaining call hang time. In some embodiments, for example, where the call hang time indicator 502 is an outline of the soft push-to-talk button 116, the electronic processor 205 adjusts at least one of a size and a color of the outline based on the value of the countdown timer. For example, as illustrated in FIG. 9, the call hang time indicator 502 is a circular progress indicator bar, surrounding the soft push-to-talk button 116. The whole of the call hang time indicator 502 represents total call hang time for the established push-to-talk channel. The call hang time indicator 502 is adjusted (that is, updated) based on the value of the countdown timer (that is, how much call hang time is remaining). In the illustrated embodiment, the call hang time indicator 502 is adjusted by decreasing the progress bar proportionally to the current value of the countdown timer, thereby indicating the remaining call hang time. In some embodiments, the call hang time indicator 502 may change form to indicate the remaining call hang time. For example, the width or another visual characteristic of the outline may be adjusted. In some embodiments, the remaining call hang time may also be indicated using color. For example, the call hang time indicator 502 may be displayed in different colors indicating that a percentage of the call hang time remains (for example, green may indicate that more than 50% remains, yellow may indicate that more than 25% remains, and red may indicate that less than 25% remains). In some embodiments, the call hang time indicator 502 includes a glowing and/or flashing or pulsating light to indicate the remaining call hang time. For example, a colored glow may surround the outline and pulsate with a frequency indicating the countdown timer duration.

Figure 10:
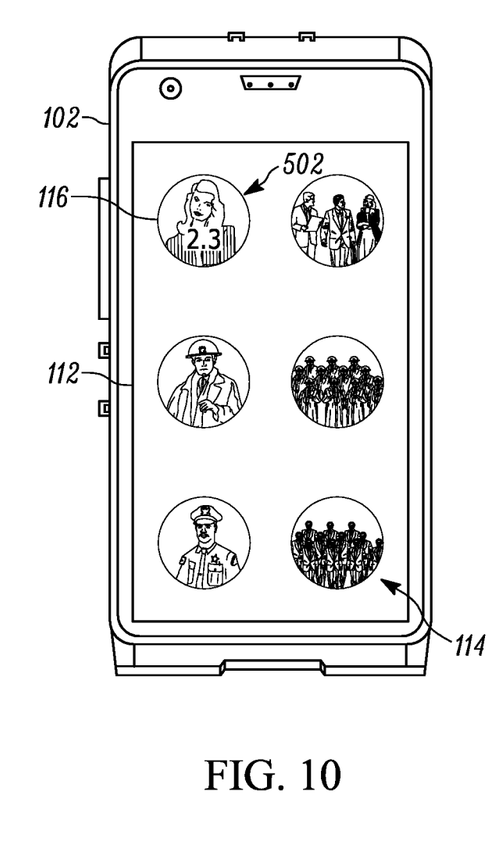

In another embodiment, electronic processor 205 visually alters the call hang time indicator 502 based on a value of the countdown time by adjusting the at least one digit based on the value of the countdown timer. As illustrated in FIG. 10, the call hang time indicator 502 reads 2.3 seconds, whereas it initially read 3.0 seconds (See FIG. 6). In such embodiments, the call hang time indicator 502 visually indicates the actual call hang time remaining (for example, in seconds, milliseconds, or another suitable unit of time), rather than symbolically displaying the call hang time.

In another embodiment, electronic processor 205 visually alters the call hang time indicator 502 based on a value of the countdown time by adjusting a color of the soft push-to-talk button 116 based on the value of the countdown timer. For example, in embodiments where the call hang time is indicated by applying a color to the soft push-to-talk button 116, the color may fade from a dark to a lighter shade to indicate the reduction in call hang time. In another example, a color of the soft push-to-talk button 116 may be varied, changed, as described above with respect to FIG. 9.

In another embodiment, electronic processor 205 visually alters the call hang time indicator 502 based on a value of the countdown time by adjusting a size of the soft push-to-talk button 116 based on the value of the countdown timer. For example, the electronic processor 205 may increase the size of the soft push-to-talk button 116 to a predetermined maximum size based on the value of the countdown timer. For example, the electronic processor 205 may set the size of the soft push-to-talk button 116 to the predetermined maximum to indicate that the call hang time has just begun, and reduce the size of the soft push-to-talk button 116 in proportion to the value of the countdown timer until the soft push-to-talk button 116 is displayed at its default size when the countdown timer reaches zero.

Figure 11:
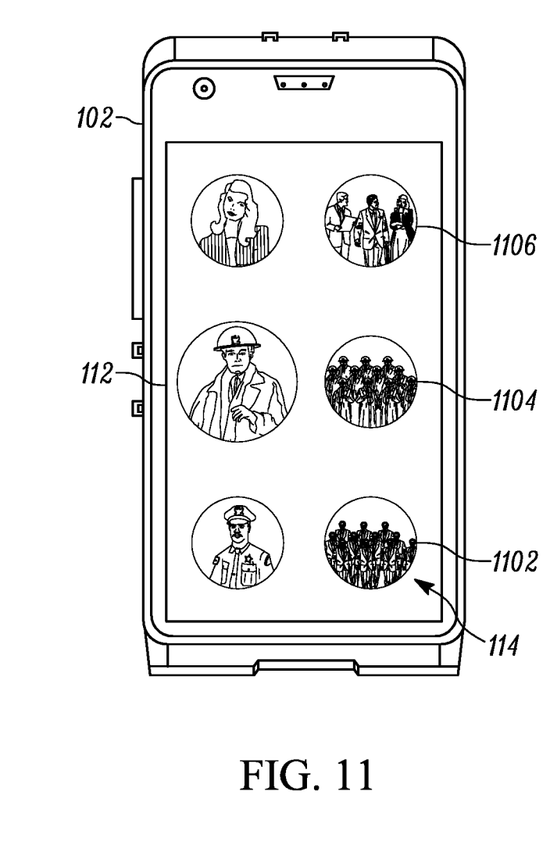
FIGS. 11, 12, and 13 illustrate a dynamic push-to-talk button for the graphical user interface of FIG. 4 in accordance with some embodiments.

In some embodiments, the electronic processor 205 generates the soft push-to-talk button 116 having a display size based on a push-to-talk selection frequency for the soft push-to-talk button 116. The push-to-talk selection frequency is a measure of how often a soft push-to-talk button has been selected (that is, used to initiate push-to-talk communications) during a particular time period (for example, the last five minutes). For example, as illustrated in FIG. 11, the soft push-to-talk button 1102, the soft push-to-talk button 1104, and the soft push-to-talk button 1106 are displayed in small, medium, and large sizes, respectively. This may indicate that the soft push-to-talk button 1106 was used more frequently with respect to the other soft push-to-talk buttons, that the soft push-to-talk button 1102 was used least frequently, and that the soft push-to-talk button 1104 was used at some frequency in between the other two. In such embodiments, the predetermined maximum size used to indicate call hang time for a particular push-to-talk button may be greater than the display size of the push-to-talk button, so as to more clearly indicate the call hang time.

In some embodiments, the electronic processor 205 alters both the size and a color of the soft push-to-talk button 116 based on the countdown timer.

When a push-to-talk transmission is made during the call hang time, the call hang time resets. For example, the electronic processor 205 receives, while the countdown timer is above a threshold (for example, the time is above zero), an input selecting the soft push-to-talk button 116. This input transmits audio communications on the established push-to-talk channel. In response to receiving the input, in addition to transmitting audio communications, the electronic processor 205 resets the countdown timer to the call hang time.

Figure 12:
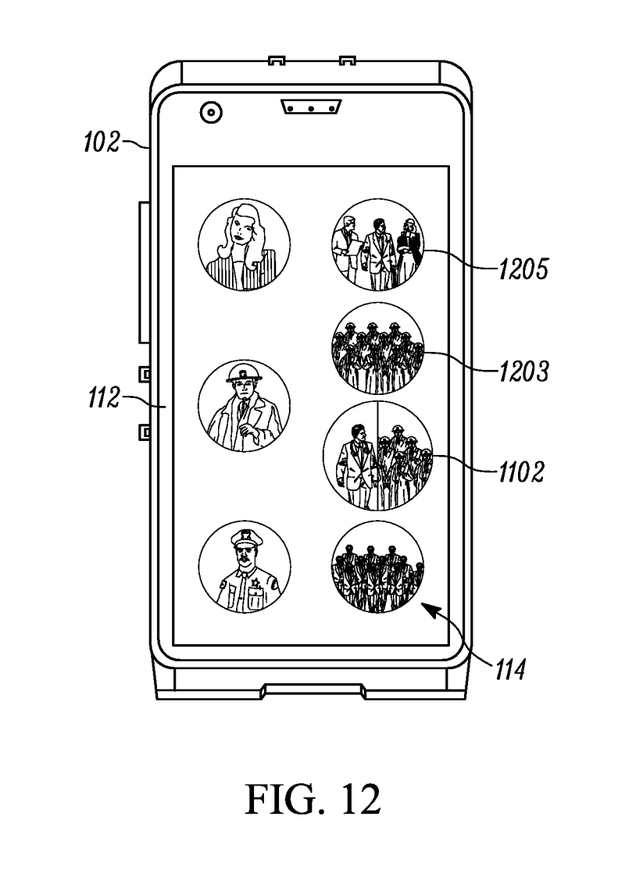
Figure 13:
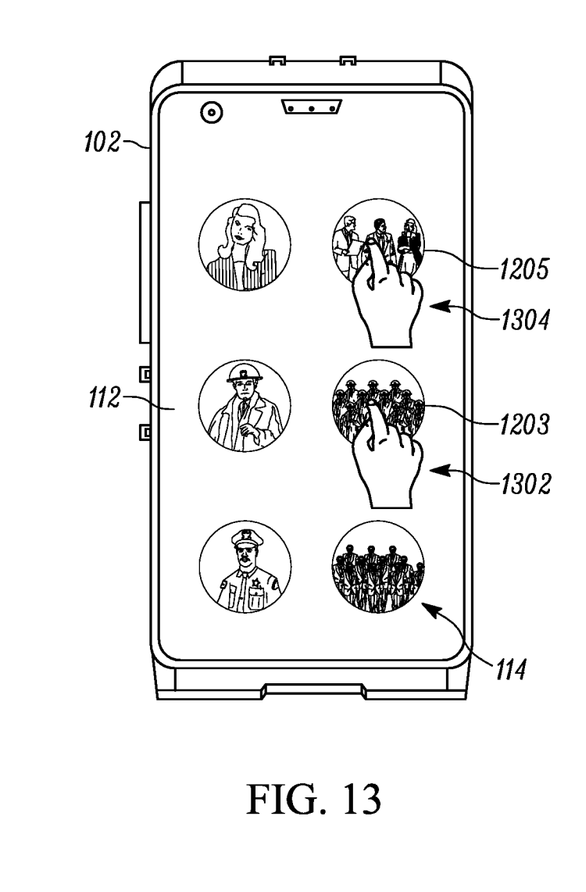

In some embodiments, the soft push-to-talk button is a dynamic compound push-to-talk button 1202 (See FIG. 12). As illustrated in FIG. 12, the dynamic compound push-to-talk button 1202 represents a combination of the soft push-to-talk button 1203 and the soft push-to-talk button 1205. The electronic processor 205, when it receives an input selecting the dynamic compound push-to-talk button 1202, establishes a first push-to-talk channel (the push-to-talk channel associated with the soft push-to-talk button 1203) and a second push-to-talk channel (the push-to-talk channel associated with the soft push-to-talk button 1205) simultaneously via the transceiver. The dynamic compound push-to-talk button 1202 is dynamic, because the electronic processor 205 generates it automatically. For example, as illustrated in FIG. 13, when the soft push-to-talk button 1203 and the soft push-to-talk button 1205 are selected simultaneously via the inputs 1302 and 1304 to transmit audio communications to two users or groups of users, the electronic processor 205 generates the dynamic compound push-to-talk button 1202 automatically and displays in on the touch screen display 112. This enables a user to easily engage in subsequent push-to-talk communications with the same two users or groups of users by selecting only one soft push-to-talk button. The dynamic compound push-to-talk button 1202 may be generated based on communications to more than two users or groups of users and, when selected, such a dynamic compound push-to-talk button establishes more than two push-to-talk channels simultaneously. In some embodiments, the network controller 110 combines push-to-talk transmission and reception from different push-to-talk channels into same push-to-talk channel.

In some embodiments, the electronic processor 205 generates the dynamic compound push-to-talk button 1202 when push-to-talk audio is received over a push-to-talk channel established by a transmitting electronic communication device via a dynamic compound push-to-talk button on the transmitting electronic communication device. In such embodiments, the electronic processor 205 generates the dynamic compound push-to-talk button 1202 with the same properties as the dynamic compound push-to-talk button on the transmitting electronic communication device.

In embodiments that include a dynamic compound push-to-talk button, a call hang time indicator for the dynamic compound push-to-talk button 1202 may be based on one or both of the call hang times for the first push-to-talk channel and the second push-to-talk channel. For example, the countdown timer may be set to the lower of the two call hang times or to the value for both call hang times if they are identical.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic communications device, the device comprising:
   a transceiver;
   a touch screen display; and
   an electronic processor electrically coupled to the transceiver and the touch screen display, the electronic processor configured to
      generate a graphical user interface including a soft push-to-talk button and a call hang time indicator, indicating visually a call hang time, in proximity to the soft push-to-talk button; display the graphical user interface on the touch screen display;
      receive, from the touch screen display, a first input selecting the soft push-to-talk button; and
      in response to receiving the first input, establish a push-to-talk channel via the transceiver.

2. The device of claim 1, wherein the electronic processor is further configured to
   receive, from the touch screen display, a second input unselecting the soft push-to-talk button; and
   in response to receiving the second input, set a countdown timer to the call hang time;
   wherein the call hang time is a time period, during which the push-to-talk channel remains available to the transceiver.

3. The device of claim 2, wherein the electronic processor is further configured to visually alter the call hang time indicator based on a value of the countdown timer.

4. The device of claim 3, wherein the electronic processor is further configured to:
   receive, while the countdown timer is above a threshold, a third input selecting the soft push-to-talk button; and
   in response to receiving the third input, reset the countdown timer to the call hang time.

5. The device of claim 3, wherein
   the call hang time indicator includes at least one digit; and
   the electronic processor is further configured to adjust the at least one digit based on the value of the countdown timer.

6. The device of claim 3, wherein
   the call hang time indicator includes an outline of the soft push-to-talk button; and
   the electronic processor is further configured to adjust at least one of a size and a color of the outline based on the value of the countdown timer.

7. The device of claim 3, wherein the electronic processor is further configured to adjust at least one of a size and a color of the soft push-to-talk button based on the value of the countdown timer.

8. The device of claim 3, wherein the electronic processor is further configured to
   generate the soft push-to-talk button having a display size based on a push-to-talk selection frequency for the soft push-to-talk button; and
   increase the size of the soft push-to-talk button to a predetermined maximum size based on the value of the countdown timer;
   wherein the maximum size is greater than the display size.

9. The device of claim 1, wherein the soft push-to-talk button is a dynamic compound push-to-talk button, and wherein the electronic processor is further configured to in response to receiving the first input, establish a plurality of push-to-talk channels via the transceiver.

10. A method for controlling an electronic communications device including a transceiver, a touch screen display, and an electronic processor, the method comprising:
    generating, with the electronic processor, a graphical user interface including a soft push-to-talk button and a call hang time indicator, indicating visually a call hang time, in proximity to the soft push-to-talk button;
    displaying the graphical user interface on the touch screen display;
    receiving, from the touch screen display, a first input selecting the soft push-to-talk button; and
    in response to receiving the first input, establishing a push-to-talk channel via the transceiver.

11. The method of claim 10, further comprising:
    receiving, from the touch screen display, a second input unselecting the soft push-to-talk button; and
    in response to receiving the second input, setting a countdown timer to the call hang time;
    wherein the call hang time is a time period, during which the push-to-talk channel remains available to the transceiver.

12. The method of claim 11, further comprising:
    visually altering the call hang time indicator based on a value of the countdown timer.

13. The method of claim 12, further comprising:
    receiving, while the countdown timer is above a threshold, a third input selecting the soft push-to-talk button; and
    in response to receiving the third input, resetting the countdown timer to the call hang time.

14. The method of claim 12, wherein adjusting the call hang time indicator includes adjusting at least one digit based on the value of the countdown timer.

15. The method of claim 12, wherein adjusting the call hang time indicator includes adjusting at least one of a size and a color of an outline of the soft push-to-talk button based on the value of the countdown timer.

16. The method of claim 12, wherein adjusting the call hang time indicator includes adjusting at least one of a size and a color of the soft push-to-talk button based on the value of the countdown timer.

17. The method of claim 12, further comprising:
    generating the soft push-to-talk button having a display size based on a push-to-talk selection frequency for the soft push-to-talk button; and
    increasing the size of the soft push-to-talk button to a predetermined maximum size based on the value of the countdown timer;
    wherein the maximum size is greater than the display size.

18. The method of claim 10, further comprising:
    in response to receiving the first input, establishing a plurality of push-to-talk channels via the transceiver;
    wherein generating a graphical user interface including a soft push-to-talk button includes generating a graphical user interface including a dynamic compound push-to-talk button.

* * * * *